(12) United States Patent
Loen

(10) Patent No.: US 7,312,861 B2
(45) Date of Patent: Dec. 25, 2007

(54) METHOD AND APPARATUS FOR MEASURING THE ANGULAR ORIENTATION BETWEEN TWO SURFACES

(76) Inventor: Mark Vincent Loen, 200 Fernwood Rd., Apt. 14, Wintersville, OH (US) 43953

( * ) Notice: Subject to any disclaimer, the term of this patent is extended or adjusted under 35 U.S.C. 154(b) by 441 days.

(21) Appl. No.: 10/932,895

(22) Filed: Sep. 2, 2004

(65) Prior Publication Data

US 2005/0052640 A1  Mar. 10, 2005

Related U.S. Application Data

(60) Provisional application No. 60/500,940, filed on Sep. 8, 2003.

(51) Int. Cl.
  *G01B 11/26* (2006.01)
  *G01C 1/00* (2006.01)
(52) U.S. Cl. .................. 356/138; 356/152.3
(58) Field of Classification Search ........... 356/138, 356/152.3
  See application file for complete search history.

(56) References Cited

U.S. PATENT DOCUMENTS

| | | |
|---|---|---|
| 3,552,859 A | 1/1971 | Snyder, III |
| 3,834,820 A | 9/1974 | Bock |
| 3,902,810 A | 9/1975 | Hamar |
| 3,947,970 A | 4/1976 | Lesure |
| 4,088,409 A | 5/1978 | Furness |
| 4,272,317 A | 6/1981 | Roerig |
| 4,290,289 A | 9/1981 | Capriotti |
| 4,298,281 A | 11/1981 | Schave |
| 4,319,406 A | 3/1982 | Pehrson et al. |
| 4,410,269 A * | 10/1983 | Jeffery ................. 356/138 |
| 4,573,274 A | 3/1986 | Albert |
| 4,864,148 A * | 9/1989 | Lysen et al. ............. 250/559.3 |
| 5,026,998 A * | 6/1991 | Holzl .................. 250/559.37 |
| 5,123,736 A | 6/1992 | Pierik |
| 5,402,226 A * | 3/1995 | Matthews et al. ....... 356/141.3 |
| 5,430,539 A * | 7/1995 | Lysen ..................... 356/152.1 |
| 5,579,585 A | 12/1996 | Schaeffer |
| 5,949,684 A | 9/1999 | Kirkwood-Azmat |
| 6,040,903 A * | 3/2000 | Lysen et al. .............. 356/153 |
| 6,049,378 A | 4/2000 | Busch et al. |
| 6,628,378 B1 * | 9/2003 | Marangoni et al. ......... 356/150 |
| 6,763,597 B2 * | 7/2004 | Lysen ......................... 33/286 |
| 2001/0052983 A1 * | 12/2001 | Hermann .................... 356/614 |

OTHER PUBLICATIONS

U.S. Appl. No. 10/802,338, Loen.

* cited by examiner

*Primary Examiner*—Roy M. Punnoose

(57) ABSTRACT

A device and method are disclosed that measure the relative angular orientation between two surfaces. Two frames are mounted on the two surfaces to be measured. One frame has a collimated light source and a measuring scale. The other frame has a mirror. The collimated light is projected from the first frame and reflected off the mirror back to the scale on the first frame. The collimated light beam position on the scale is used to calculate the non-parallel angle between the two rolls. The method and measuring scale can be adapted to provide accurate measurement of very small, near parallel orientation angles. The two frames can be adapted to measure the angular orientation of important surfaces such as rolls or odd shapes that are otherwise difficult to measure.

14 Claims, 5 Drawing Sheets

METHOD AND APPARATUS FOR MEASURING THE ANGULAR ORIENTATION BETWEEN TWO SURFACES

RELATED APPLICATIONS

This application claims the benefit of U.S. Provisional Patent Application Ser. No. 60/500,940 filed on Sep. 8, 2003.

STATEMENT REGARDING FEDERALLY SPONSORED RESEARCH OR DEVELOPMENT

Not Applicable.

REFERENCE TO SEQUENCE LISTING, A TABLE, OR COMPUTER PROGRAM LISTING

Not Applicable.

BACKGROUND OF THE INVENTION

1. Field of the Invention

The present invention is generally directed to measuring the relative angular orientation of one surface to another surface. In particular, the invention is especially useful for measuring the angular orientation of two nearly parallel roll surfaces. The invention can be adapted to absolute measurement relative to a fixed reference provided one of the surfaces is at a known reference orientation. The two surfaces are assumed to be in a side by side arrangement rather than in line with each other.

2. Discussion of the Prior Art

Methods to measure roll to roll parallel alignment have been described in previous patents and patent applications. In U.S. Pat. No. 6,628,378 by Marangoni, et al., a two frame invention indicates whether two rolls are oriented in a parallel alignment condition. A laser on one frame projects a light beam to a second frame with a target. On the second frame, the position of laser beam on the target indicates whether the rolls are in a parallel aligned condition. A second laser beam and second target orients the two frames correctly for accurate measurement.

There are some limitations with this method. The two laser beams must be projected perpendicular to the first surface. The use of a secondary visual target with crosshairs for positioning of the two frames longitudinally to each other does not provide highly accurate positioning. Longitudinal positioning errors directly affect the angular measurement readings and reduce the measuring accuracy of the parallel orientation. Laser beam divergence and thermal drift present additional accuracy problems. In actual use, it is frustrating to rotationally and longitudinally orient the two frames correctly to obtain a precise reading. A separate calibration frame is used to check the alignment of the laser and optics.

In patent application Ser. No. 10/802,338 by Loen, two frames are mounted on two surfaces where the angular orientation of the two surfaces is to be measured. The distance between defined points on the two frames is used to measure the angular orientation. Measuring errors can be difficult to control when the surfaces are a large distance apart.

BRIEF SUMMARY OF THE INVENTION

Accordingly, it is the object of this invention to directly and accurately measure the parallel angular orientation between two surfaces, avoiding limitations in previous methods. The device consists of two mounting frames that are mounted on the two surfaces to be measured. A laser beam on the first frame is projected onto a mirror mounted on the second frame. The beam is reflected back to the first frame where the position of the beam on a scale indicates the angular orientation of the two surfaces. A method is included for checking the calibration of the invention in the field without the need for special calibration equipment.

DETAILED DESCRIPTION OF THE INVENTION

Figure 1:
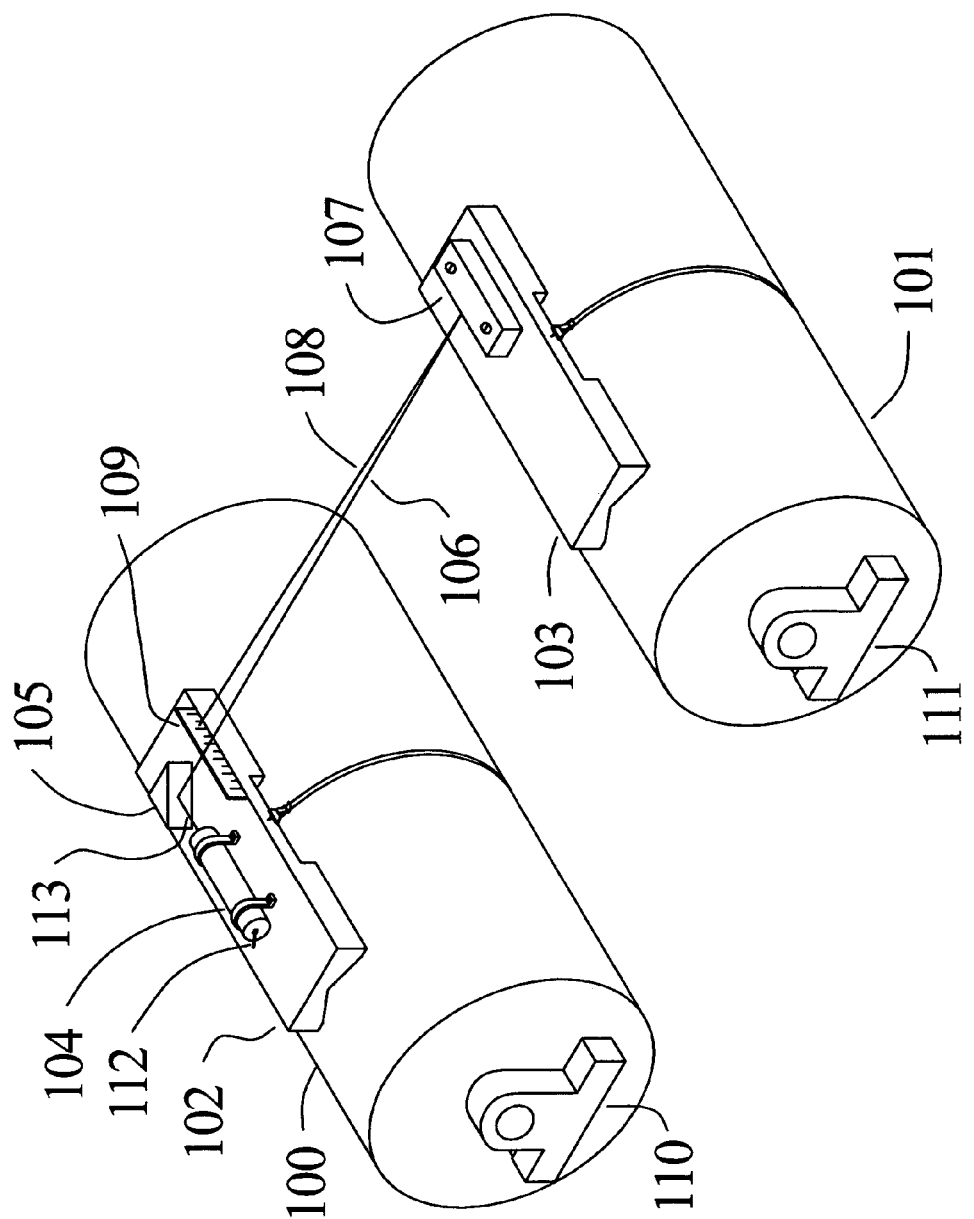
FIG. 1 shows an embodiment of the device where the collimated light beam is directed toward a mirror and reflects back to a scale on the first frame. The position of the collimated light beam on the scale is determined visually.

The invention includes two frames that are mounted on the two surfaces where the angular orientation of the two surfaces is to be measured. The first frame has a collimated light source, such as a diode laser beam, that projects a round light beam approximately perpendicular to the first surface. The first frame also includes a measuring scale. The second frame has a mirror that reflects the collimated light source backward toward the scale on the first frame. The collimated light source is switched on and the collimated light is directed toward the second frame mirror while maintaining the first frame parallel to the first surface. The second frame is then adjusted so that the reflected collimated light beam is directed toward the scale on the first frame while maintaining the second frame parallel to the second surface. The position of the collimated light beam on the scale is used to calculate the non-parallel angle between the two rolls. The accuracy of this measuring method improves as the two mounting frames are spaced further apart. The term scale means a position indicating instrument adapted to measuring the position of the collimated light beam.

The projection of the collimated light beam from the first frame and the position of the mirror on the second frame are coordinated so that the beam falls on the scale at the zero angle point when the surfaces are parallel to each other. The mirror angle, the collimated light source projection angle, or both can be adjusted. It is not necessary for the collimated light beam to be projected exactly perpendicular from the first surface for the invention to be accurate. An additional, second scale measurement can be made by switching the frames on the two surfaces. Both scale readings are then used to calculate the angular orientation.

Preferably, the two frames are mounted so that they are substantially in plane with each other. Twisting of the two frames relative to the plane defined by the light beam path will cause unwanted measuring errors. For best accuracy, twist angles above 10 degrees should be avoided. The angular orientation between the two surfaces is measured in the plane defined by the light beam path. As a convenience feature, a level indicating instrument can be incorporated into either mounting frame such as a vial with a bubble.

The measuring resolution greatly depends upon how finely the position of the round collimated light beam can be determined on the scale. In one embodiment, the light beam position is determined by a simple visual inspection. In a preferred embodiment, the light beam position is determined by the use of a Position Sensing Device (herein referred to as "PSD"). A PSD consists of a small light sensitive area that can measure the position of a light beam to a very high accuracy using an electronic current output. The PSD electronic output indicates the light beam position. Alternatively, the PSD can be moved so that the light beam is centered on the PSD and the position of the PSD is measured by a scale or indicator.

In another embodiment, the scale on the first frame is adapted to use a movable wire to divide the reflected collimated light beam in two parts. The wire is centered in the collimated light beam by visually equalizing the beam brightness of two parts. The position of the wire on the scale is then measured. This method determines the position of the collimated light beam to a very high resolution. In a laboratory experiment, a 0.057 inch thick wire in a 0.12 inch diameter beam could be centered in the beam to within 0.004 inches at a 99% confidence level. Laboratory experiments with other beam diameters demonstrated that a wire can be centered in a diode laser light beam to within approximately 4% of the light beam diameter.

The non-parallel angle $\beta$ is calculated by measuring the position of the collimated light beam on the scale. If the mirror position on the second frame is calibrated to reflect a beam back to the zero scale position when the two rolls are in parallel alignment, the non-parallel alignment angle $\beta$ can be calculated by:

$$\beta = \tan^{-1}\left[\frac{\text{Scale Reading}}{2(\text{Distance Between Frames})}\right]$$

The invention does not require the collimated light beam to be projected perpendicular to the first surface or coordinated with the angular position of the mirror on the second frame. In one embodiment, a method can be used where two readings are taken. A first reading of the collimated light beam position on the scale is made, and then the two frames are switched on the two rolls. A second reading is then taken. The difference between the two readings and the distance between the two frames is used to calculate the non-parallel angle $\beta$:

$$\beta = \tan^{-1}\left[\frac{\text{Reading}_1 - \text{Reading}_2}{4(\text{Distance Between Units})}\right]$$

This method allows the accurate determination of the non-parallel angle $\beta$ to be determined even if the frame is out of calibration. This method provides accuracy even if the laser projection angle from the first surface is not perpendicular, if there are mirror misalignments, or if there are scale positioning errors.

Alternatively, this method allows for a check to ensure that the angular projection of the collimated light beam and the angular position of the mirror are coordinated correctly. This method also provides for field calibration even on surfaces that are not parallel. For example, when the two surfaces are not parallel, the position of the mirror on the second frame may be adjusted so that the first reading is equal and opposite to the second reading.

In one preferred embodiment the collimated light beam source is placed on a rotational axis on the first mounting frame. The frame is designed so that the light source rotational axis is parallel to the surface to be measured. This feature provides an easy adjustment of the collimated light beam position so that it projects onto the second frame mirror. This is helpful when the surface to be measured cannot be conveniently rotated. Similarly, the mirror on the second frame can also be placed on a rotational axis on the second frame parallel to the second surface. This feature provides an easy adjustment of the reflected collimated light beam so that it projects onto the first frame scale.

The invention can be adapted to measuring the angular orientation of many kinds of surfaces. The frames can include an edge or a surface that matches the surface to be measured.

The two frames do not require a particular longitudinal orientation on the surfaces to be measured provided that the mirror is flat. The projection of the collimated light only has to strike anywhere on the mirror surface.

Additional mirrors may be mounted on the second frame and used to reflect the collimated light beam at a more convenient position on the first frame. If more than one mirror is used, an odd number of mirrors should be used. The angular orientation angle will then utilize the same calculating method. If an even number of mirrors is used, the non-parallel angle calculation is not based on the distance between the two mounting frames. In this case, the calculation is based on the scale reading and a fixed distance.

FIG. 1 shows a preferred embodiment of the invention. The non-parallel angle between two rolls is to be measured. A first roll (100) and a second roll (101) are accurately represented by a cylindrical shape. A first mounting frame (102) and a second mounting frame (103) are shown temporarily attached to the first and second rolls (100, 101) respectively. A collimated light source (104) is turned on by switch (112) and the collimated light beam (113) is directed toward mirror (105). The collimated light beam (113) reflects off mirror (105) toward the mirror (107) on the second mounting frame (103). The collimated light beam (106) reflects off mirror (107) and is directed toward the scale (109) on the first mounting frame (102). The position of the collimated light beam (108) on the scale (109) is used to determine the non-parallel angle $\beta$ as previously described. The positioning of the first mounting frame (102) is aligned to the first roll (100) surface so that the collimated light beam (113) is projected approximately perpendicular to the first roll surface. The position of the second mounting frame (103) is aligned to the second roll (101) surface so that the mirror is aligned parallel to the second roll surface. The scale (109) is aligned to be parallel with the roll (100) central longitudinal axis.

The direction of the collimated light beam (106) toward the mirror (107) can be made by rotating the first roll (100) about its bearings (110) so that the collimated light beam will hit anywhere on the mirror (107). The mirror (107) can be any suitable size provided that it is flat. Alternately, the direction of the collimated light beam (106) toward the mirror (107) can be made by carefully placing the first mounting frame (102) at the correct orientation. The direction of the collimated light beam (108) toward the scale (109) can be made by rotating the second roll (101) about its bearings (111) so that the collimated light beam (108) is directed to the scale (109). Alternately, the direction of the collimated light beam (108) toward the scale (109) can be made by carefully placing the second mounting frame (103) on the second roll (101).

Figure 2:
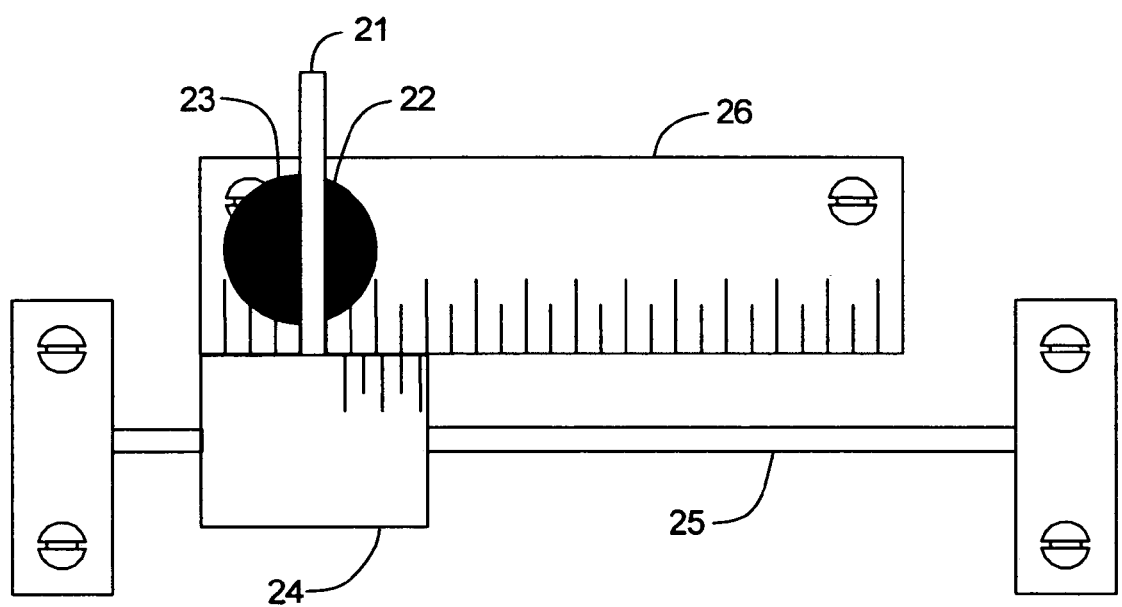
FIG. 2 shows an embodiment where a wire is used to determine the position of the collimated light beam on the scale. The wire is centered in the beam and the wire position indicates the center position of the collimated light beam on the scale.

FIG. 2 shows a detail of a scale design that more accurately determines the position the collimated light beam. In FIG. 1, the collimated light beam position on the scale is determined visually. In FIG. 2, a thin movable wire (21) is used to separate the collimated light beam into two circle segments (22, 23). The thin wire (21), less than the diameter of the collimated light beam, is attached to slider (24). The thin wire (21) is moved on the slider rod (25) until the two circle segments (22, 23) are equal. The position of the wire (21) is indicated by a reading on the scale (26). Alternately, the position of the wire can be indicated by many other position indicating instruments that are well known in the art which includes electronic instruments, mechanical indicators, vernier scales, and the like.

Figure 3:
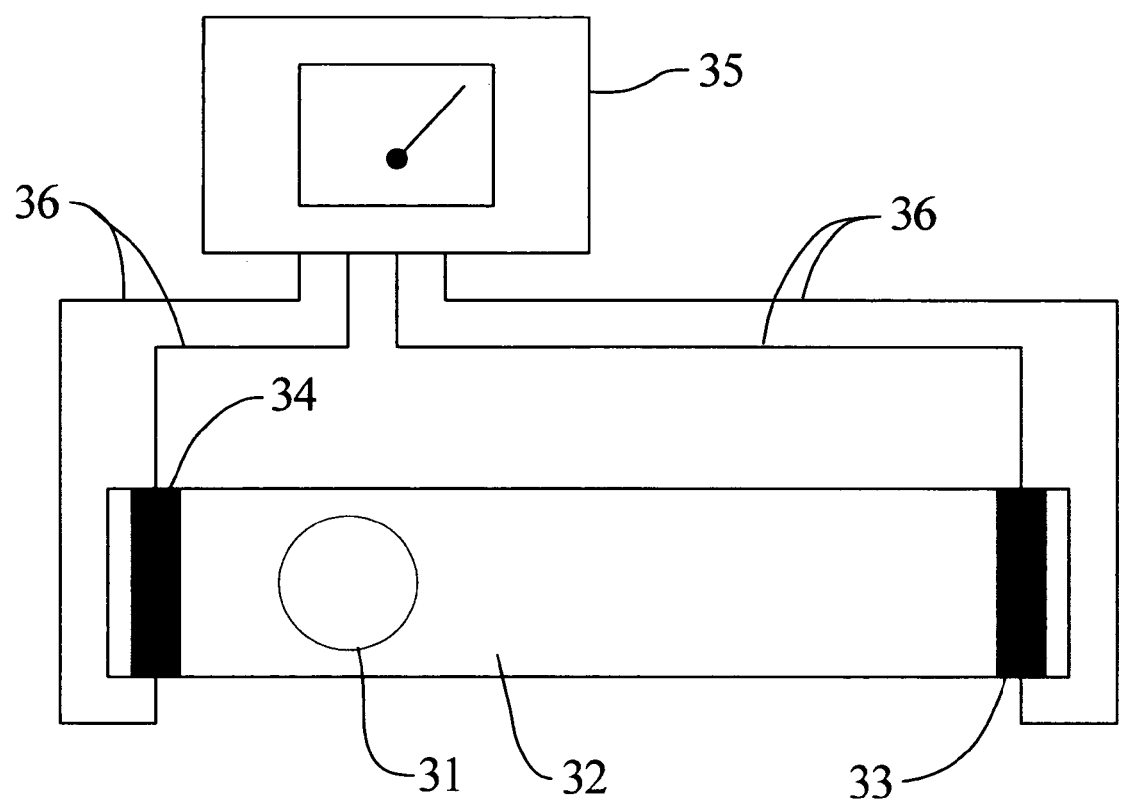
FIG. 3 shows an embodiment where a Position Sensing Device (PSD) is used to find the location of the collimated light beam on the scale.

FIG. 3 shows a detail of a scale design that provides a highly accurate measurement of collimated light beam position. A PSD is used for the scale on the first mounting frame. The collimated light beam (31) is projected onto the sensing device area (32). The electronic output varies at each end of the PSD (33, 34) depending upon where the collimated light beam (31) is relative to each end. The electronic output from the ends (33) and (34) is then routed through wiring (36) to an electronic indicator (35). The relative ratio of current is computed to indicate a position that is scalable to an actual length in inches. Generally, PSD devices provide a current output based on the position of the beam.

Various adaptations of the PSD will be obvious to those skilled in the art. For example, the PSD can be placed on a slider and the position of the PSD changed until the collimated light beam is centered on the PSD. The position of the PSD on the slider is then used to determine the non-parallel angle β.

Figure 4:
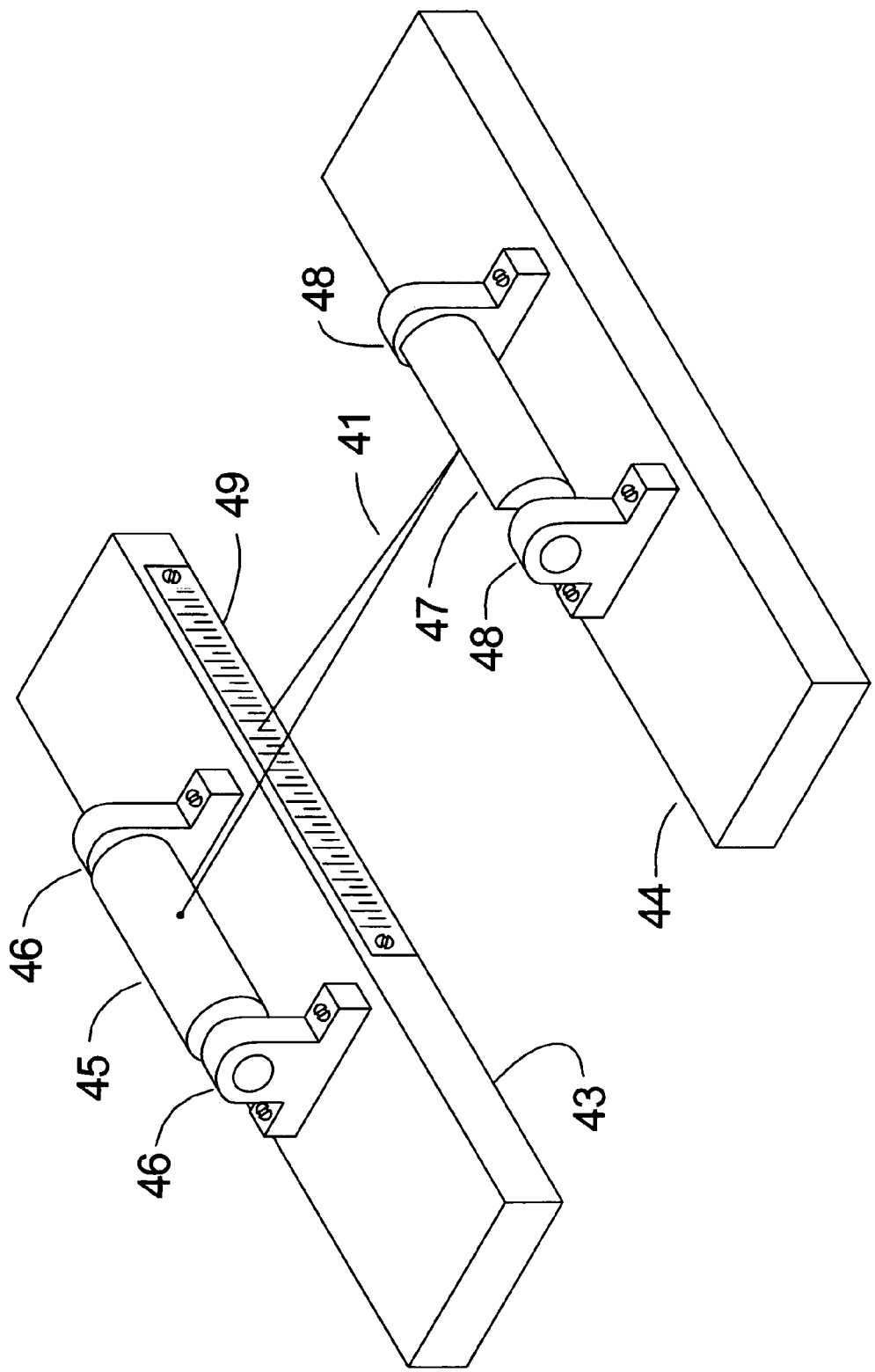
FIG. 4 shows a preferred embodiment where the collimated light beam rotates about an axis on the frame that is temporarily attached to the first roll. The mirror is mounted on a rotational axis on the frame that is temporarily attached to the second roll.

FIG. 4 shows and adaptation of the invention that provides rapid direction of the position of the collimated light beam (41) onto the scale (49). The two rectangular shaped frames (43, 44) are adapted to measuring the parallel angular orientation of two straight edges or flat surfaces. The collimated light beam source (45) is mounted on bearings (46) that allow the collimated light source (45) to be rotated about an axis that is substantially parallel to the frame (43) edges. Similarly, the mirror (47) is mounted on bearings (48) that allow the mirror (47) to be rotated about an axis that is substantially parallel to the second frame (44) edges. The scale (49) is fixed on frame (43) and is used to obtain reading positions of the collimated light beam.

Figure 5:
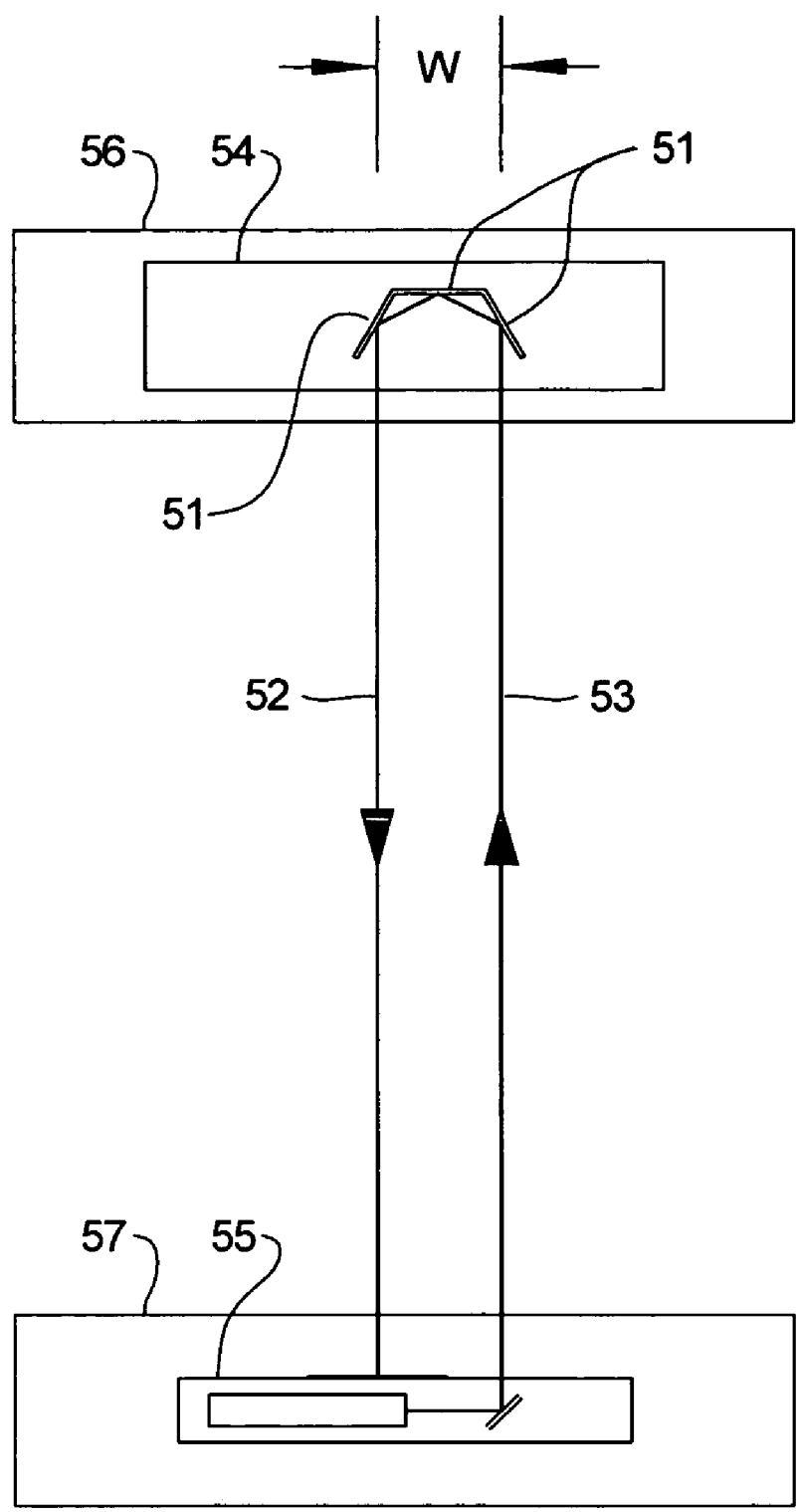
FIG. 5 shows an adaptation where the projection of the collimated light beam is redirected back to the first frame scale at a more convenient point.

FIG. 5 shows the plan view of an embodiment of the second frame where the projection of the collimated light beam is redirected back to the first frame scale at a more convenient point. Three mirrors (51) reflect the beam back (52) at a distance W from the initial projected beam (53). The mounting frames (54, 55) are mounted on the top of two roll surfaces (56, 57).

While specific measuring methods, dimensional relationships, and computational methods have been disclosed herein, it should be recognized that the above novel disclosures will suggest adaptations to those skilled in the art to the measurement of other parallel and non parallel alignment orientations. Therefore, for the purpose of evaluating patent coverage for the disclosed invention, reference should be made to the appended claims for interpretation of the above disclosures.

I claim:

1. A method to measure an angular orientation between two surfaces using:
   A. a first mounting frame mounted on a first surface,
   B. a second mounting frame mounted on a second surface,
   C. a mirror that is attached to said second mounting frame,
   D. a collimated light source attached to said first mounting frame which projects a first collimated light beam toward said mirror,
   E. a position indicating scale attached to said first mounting frame which is adapted to measure the position of said first collimated light beam,
   F. said first collimated light beam is reflected back toward said position indicating scale,
   G. the position of said first collimated light beam on said position indicating scale is determined,
   H. a plane is defined by the path of said first collimated light beam between said first mounting frame and said second mounting frame and by said position indicating scale, and
   I. the distance between said first mounting frame and said second mounting frame is measured,
   whereby said angular orientation between said first surface and said second surface is determined in said plane based on the position of said first collimated light beam on said position indicating scale.

2. The method according to claim 1 whereby said position indicating scale divides said first collimated light beam into two parts using a dividing instrument, and the position of said dividing instrument is measured on said position indicating scale.

3. The method according to claim 1 whereby
   A. said collimated light source is mounted on a first rotating axis where said first rotating axis is oriented parallel to said first surface, and
   B. said mirror is mounted on a second rotating axis where said second rotating axis is oriented parallel to said second surface.

4. The method according to claim 1 whereby said position indicating scale includes an electronic position sensing device.

5. The method according to claim 1 whereby said first surface is a roll and said second surface is a roll.

6. The method according to claim 1 whereby said angular orientation is determined by the additional steps of:
   A. mounting said first mounting frame on said second surface,
   B. mounting said second mounting frame on said first surface,
   C. said collimated light source projects a second collimated light beam toward said mirror, D. said second collimated light beam is reflected back toward said position indicating scale, and E. the position of said second collimated light beam on said position indicating scale is determined.

7. The method according to claim 1 whereby a second mirror and a third mirror are attached to said second mounting frame whereby said second mirror and said third mirror are in the path of the said first collimated light beam and reflect the said first collimated light beam to the said position indicating scale.

8. The apparatus used to measure an angular orientation between two surfaces using:

A. a first mounting frame mounted on a first surface,

B. a second mounting frame mounted on a second surface,

C. a milTor that is attached to said second mounting frame,

D. a collimated light source attached to said first mounting frame which projects a first collimated light beam toward said mirror, E. a position indicating scale attached to said first mounting frame which is adapted to measure the position of said first collimated light beam, F. said first collimated light beam is reflected back toward said position indicating scale, G. the position of said first collimated light beam on said position indicating scale is determined, H. a plane is defined by the path of said first collimated light beam between said first mounting frame and said second mounting frame and by said position indicating scale, and I. the distance between said first mounting frame and said second mounting frame is measured, whereby said angular orientation between said first surface and said second surface is determined in said plane based on the position of said first collimated light beam on said position indicating scale.

9. The apparatus according to claim 8 whereby said position indicating scale divides said first collimated light beam into two parts using a dividing instrument, and the position of said dividing instrument is measured on said position indicating scale.

10. The apparatus according to claim 8 whereby

A. said collimated light source is mounted on a first rotating axis where said first rotating axis is oriented parallel to said first surface, and B. said mirror is mounted on a second rotating axis where said second rotating axis is oriented parallel to said second surface.

11. The apparatus according to claim 8 whereby said position indicating scale includes an electronic position sensing device.

12. The apparatus according to claim 8 whereby said first surface is a roll and said second surface is a roll.

13. The apparatus according to claim 8 whereby said angular orientation is determined by the additional steps of:

A. mounting said first mounting frame on said second surface,

B. mounting said second mounting frame on said first surface,

C. said collimated light source projects a second collimated light beam toward said mirror, D. said second collimated light beam is reflected back toward said position indicating scale, and E. the position of said second collimated light beam on said position indicating scale is determined.

14. The apparatus according to claim 8 whereby a second mirror and a third mirror are attached to said second mounting frame whereby said second mirror and said third mirror are in the path of the said first collimated light beam and reflect the said first collimated light beam to the said position indicating scale.

* * * * *